(12) United States Patent
Lu (10) Patent No.: US 10,878,212 B2
(45) Date of Patent: Dec. 29, 2020

(54) TWO-DIMENSIONAL CODE SCANNING INTERACTION METHODS AND APPARATUSES

(71) Applicant: Advanced New Technologies Co., Ltd., Grand Cayman (KY)

(72) Inventor: Yaran Lu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 15/594,489

(22) Filed: May 12, 2017

(65) Prior Publication Data

US 2017/0249492 A1    Aug. 31, 2017

Related U.S. Application Data

(63) Continuation of application No. PCT/CN2015/093631, filed on Nov. 3, 2015.

(30) Foreign Application Priority Data

Nov. 13, 2014   (CN) .......................... 2014 1 0640607

(51) Int. Cl.
   *G06K 7/14*       (2006.01)
   *G06K 7/10*       (2006.01)
   *G06F 16/955*     (2019.01)
   *G06K 19/06*      (2006.01)

(52) U.S. Cl.
   CPC ....... *G06K 7/1417* (2013.01); *G06F 16/9554* (2019.01); *G06K 7/10* (2013.01); *G06K 19/06037* (2013.01)

(58) Field of Classification Search
   CPC ......... G06F 17/30879; G06F 17/30887; G06F 17/00; G06F 17/30; G06F 17/30882
   See application file for complete search history.

(56) References Cited

U.S. PATENT DOCUMENTS 5,825,006 A *  10/1998  Longacre, Jr. ..... G06K 7/10851
                                                  235/462.27
6,389,182 B1*   5/2002  Ihara ..................... G06F 1/1616
                                                  235/462.24
(Continued)

FOREIGN PATENT DOCUMENTS

CN       102739872 A     10/2012
CN       102882993 A      1/2013
(Continued)

OTHER PUBLICATIONS

Japanese Search Report issued in Japanese Application No. 2017-525333 dated Aug. 14, 2019, 37 pages.
(Continued)

*Primary Examiner* — Christopher Stanford
(74) *Attorney, Agent, or Firm* — Finnegan, Henderson, Farabow, Garrett & Dünner, LLP (57) ABSTRACT

The present application provides two-dimensional code (2D-code) scanning interaction methods and apparatuses. An exemplary 2D-code scanning interaction method may include scanning a 2D code to obtain a first 2D-code value corresponding to the 2D code. The method may also include obtaining a second 2D-code value corresponding to the first 2D-code value. The first 2D-code value is generated in accordance with the second 2D-code value, and is corresponding to the second 2D-code value. The method may further include calling an application corresponding to the second 2D-code value and opening the second 2D-code value for interaction through the application.

15 Claims, 9 Drawing Sheets

(56) References Cited

U.S. PATENT DOCUMENTS

| | | | | |
|---|---|---|---|---|
| 6,748,122 | B1* | 6/2004 | Ihara | G06F 3/002 |
| | | | | 235/462.11 |
| 8,661,254 | B1* | 2/2014 | Sama | H04L 9/3215 |
| | | | | 713/168 |
| 2012/0036225 | A1* | 2/2012 | Chor | G06F 17/30879 |
| | | | | 709/219 |
| 2012/0126003 | A1 | 5/2012 | Wang | |
| 2012/0256000 | A1 | 10/2012 | Cok | |
| 2012/0325902 | A1* | 12/2012 | Goyal | G06F 17/00 |
| | | | | 235/375 |
| 2013/0037608 | A1* | 2/2013 | Evevsky | G06F 21/31 |
| | | | | 235/380 |
| 2013/0112752 | A1* | 5/2013 | Negro | G06K 7/10722 |
| | | | | 235/472.01 |
| 2013/0191640 | A1* | 7/2013 | Bloomer | G09C 5/00 |
| | | | | 713/172 |
| 2014/0097251 | A1* | 4/2014 | Joussen | G06K 7/1404 |
| | | | | 235/462.07 |
| 2015/0019444 | A1* | 1/2015 | Purves | G06Q 20/3821 |
| | | | | 705/76 |
| 2016/0260002 | A1* | 9/2016 | Hill | G06K 7/10722 |
| 2016/0267369 | A1* | 9/2016 | Picard | G06K 7/1417 |

FOREIGN PATENT DOCUMENTS

| | | | |
|---|---|---|---|
| CN | 102929595 | A | 2/2013 |
| CN | 103123709 | A | 5/2013 |
| CN | 103455780 | A | 12/2013 |
| CN | 103488528 | A | 1/2014 |
| CN | 103745186 | A | 4/2014 |
| CN | 104065653 | A | 9/2014 |
| JP | 2006243961 | A | 9/2006 |
| JP | 2014192664 | A | 10/2014 |
| JP | 2015510212 | A | 4/2015 |
| JP | 2015531910 | A | 11/2015 |
| KR | 1020120053981 | | 5/2012 |
| WO | WO2013/138072 | A1 | 9/2013 |
| WO | WO2014/015707 | A1 | 1/2014 |
| WO | WO 2016/074574 | A1 | 5/2016 |

OTHER PUBLICATIONS

Japanese Office Action issued in Japanese Application No. 2017-525333, dated Aug. 28, 2019, 7 pages.

Open Mobile Alliance, "White Paper on Mobile Codes," URL, //http://technical.openmobilealliance.org/Technical/release_program/docs/MobileCodes/V1_0-20081024-A/OMA-WP-MobileCodes-20081024-A.pdf, pp. 1-26 (2008).

First Chinese Office Action issued in Chinese Application No. CN201410640607.6, dated Sep. 6, 2017, 16 pages.

First Chinese Search Report issued in Chinese Application No. CN201410640607.6, dated Aug. 28, 2017, 2 pages.

PCT International Search Report and Written Opinion dated Feb. 1, 2016, issued in corresponding International Application No. PCT/CN2015/093631 (12 pages).

* cited by examiner

TWO-DIMENSIONAL CODE SCANNING INTERACTION METHODS AND APPARATUSES

CROSS REFERENCE TO RELATED APPLICATION

This application claims priority to International Application No. PCT/CN2015/093631, filed on Nov. 3, 2015, which claims priority to and the benefits of priority to Chinese Application No. CN 201410640607.6, filed Nov. 13, 2014, both of which are incorporated herein by reference in their entireties.

TECHNICAL FIELD

The present application relates to data processing technologies, and more particularly, to two-dimensional code (2D-code) scanning interaction methods and apparatus.

BACKGROUND

A two-dimensional (2D) code, also referred to as a 2D bar code, is a black-and-white pattern distributed on a plane (i.e., two-dimensional directions) with specific geometric patterns according to a certain rule. It may be a key to pertinent information data. In modern commercial activities, the 2D code may be widely applied to, for example, product anti-counterfeiting/tracing, advertisement pushing, website linking, data downloading, commodity transaction, positioning/navigation, electronic certification, vehicle management, information transmission, business card communication, and Wi-Fi sharing.

In existing technologies, a 2D code can be scanned by a smartphone by using an application with a code scanning function to acquire information represented by the 2D code, allowing the application or any corresponding applications to interact after code scanning. For example, a WeChat application may be used to scan a WeChat 2D code to enter an interaction interface. In other situations, however, when the application used for the scanning is not an application corresponding to the 2D code, the application may only display information represented by the 2D code, or may only open an application corresponding to the 2D code. That is, a related function of the opened application cannot be called after the application is opened. When a user would like to activate the related function of the application for interaction purposes, the 2D code would need to be scanned once again by using the application after the application is opened.

For example, when a 2D code of a WeChat public account is scanned by using Alipay™, the user may be prompted to use a browser to open a Uniform Resource Locator (URL) of a WeChat website. After confirming the opening, the mobile phone of the user may switch to using the browser to open such a URL. If there is no WeChat application installed in the mobile phone of the user, the mobile phone may switch to a download page of WeChat in an application store. If a WeChat application has been installed, however, the mobile phone may switch to the main user interface of the WeChat application. If the user would like to follow the WeChat public account, the user may need to scan the 2D code of the WeChat public account again after the WeChat application is opened.

Therefore, for existing technologies, it is necessary to execute multiple steps for interacting with relevant information after a 2D code has been scanned using a non-corresponding application. The scanning process is cumbersome. As a result, the data processing efficiency is relatively low.

SUMMARY

The present application provides a 2D scanning and subsequent interacting, thereby simplifying the scanning process during the interaction when using a non-corresponding application to scan a 2D code.

Correspondingly, the present application also provides an apparatus for scanning 2D code and subsequent interaction to ensure implementation and application of the above method.

To solve the above problems, the present disclosure is directed to a 2D-code scanning and interacting method. The method may include scanning a 2D code to obtain a first 2D-code value corresponding to the 2D code. The method may also include obtaining a second value of the 2D code corresponding to the first 2D-code value. The first 2D-code value is generated in accordance with the second 2D-code value, and is corresponding to the second 2D-code value. The method may further include calling an application corresponding to the second 2D-code value and opening the second 2D-code value for interaction.

In some embodiments, the first 2D-code value may include identification information. The step of obtaining the second 2D-code value corresponding to the first 2D-code value may include obtaining the second 2D-code value corresponding to the identification information by the 2D-code scanning apparatus.

In some embodiments, before calling the application corresponding to the second 2D-code value and opening the second 2D-code value for interaction, the method may further include verifying security of opening the second 2D-code value on the called application corresponding to the second 2D-code value by the 2D-code scanning apparatus. The step of calling the application corresponding to the second 2D-code value and opening the second 2D-code value for interaction may include, after verifying the security successfully, calling the application corresponding to the second 2D-code value and opening the second 2D-code value for interaction.

In some embodiments, the step of verifying security of opening the second 2D-code value on the called application corresponding to the second 2D-code value by the 2D-code scanning apparatus may include obtaining a first key corresponding to the identification information by the 2D-code scanning apparatus. The step may also include sending the first key to an application server corresponding to the application by the 2D-code scanning apparatus. The application server may store a second key corresponding to the identification information. The step may further include receiving, by the 2D-code scanning apparatus, a verification result sent by the application server. If the application server compares the first key with the second key and finds that the first and second keys are the same, the verification result is a successful security verification. If the first and second keys are different, the verification result is a failed security verification.

In some embodiments, before scanning the 2D code by the 2D-code scanning apparatus to obtain the first 2D-code value corresponding to the 2D code, the method may further include generating the 2D code in accordance with the second 2D-code value by the 2D-code scanning apparatus or a registration server.

In some embodiments, the step of generating the 2D code in accordance with the second 2D-code value may include receiving a registration request for the second 2D-code value. The step may also include generating the identification information corresponding to the second 2D-code value. The step may further include generating the first 2D-code value in accordance with the identification information. In addition, the step may include generating the 2D code in accordance with the first 2D-code value.

In another aspect, the present disclosure is directed to a 2D code scanning interaction apparatus. The apparatus may include a scanning unit configured to scan a 2D code to obtain a first 2D-code value corresponding to the 2D code. The apparatus may also include an obtaining unit configured to obtain a second 2D-code value corresponding to the first 2D-code value. The first 2D-code value is generated in accordance with the second 2D-code value, and is corresponding to the second 2D-code value. The apparatus may further include a calling unit configured to call an application corresponding to the second 2D-code value and open the second 2D-code value for interaction.

In some embodiments, the first 2D-code value may include identification information. The obtaining unit may also be configured to obtain the second 2D-code value corresponding to the identification information.

In some embodiments, the apparatus further includes a verification unit configured to verify security of opening the second 2D-code value on the called application corresponding to the second 2D-code value before the calling unit calls the application corresponding to the second 2D-code value and opens the second 2D-code value for interaction. The calling unit may be configured to call the application corresponding to the second 2D-code value and open the second 2D-code value for interaction after verifying the security successfully.

In some embodiments, the verification unit may include an acquisition sub-unit configured to acquire a first key corresponding to the identification information. The verification unit may also include a sending sub-unit configured to send the first key to an application server corresponding to the application. The application server may store a second key corresponding to the identification information. The verification unit may further include a receiving sub-unit configured to receive a verification result sent by the application server. If the application server compares the first key with the second key and finds that the first and second keys are the same, the verification result is a successful security verification. If the first and second keys are different, the verification result is a failed security verification.

In some embodiments, the apparatus may further include a 2D code generation unit configured to generate the 2D code in accordance with the second 2D-code value before the scanning unit scans the 2D code to obtain the first 2D-code value corresponding to the 2D code.

In some embodiments, the 2D code generation unit may include a request receiving sub-unit configured to receive a registration request for the second 2D-code value. The 2D code generation unit may also include a first generation sub-unit configured to generate the identification information corresponding to the second 2D-code value. The 2D code generation unit may further include a second generation sub-unit configured to generate the first 2D-code value in accordance with the identification information. In addition, the 2D code generation unit may include a third generation sub-unit configured to generate the 2D code in accordance with the first 2D-code value.

Compared with the existing technologies, the method of the present application may have the following advantages. The method of the present application, by processing a 2D-code value in advance, may allow a 2D-code scanning apparatus, when scanning a processed 2D code, to obtain a corresponding original 2D-code value before processing in accordance with the processed valued of 2D code. It may allow an application corresponding to the original 2D-code value to be called to open the original 2D-code value and present an interaction interface. Accordingly, it may avoid the need to download another application or to scan the 2D code once again in the existing technologies for entering into the interaction interface when scanning by using a non-corresponding application. Therefore, the scanning process is simplified, the number of interactions is reduced, and data processing efficiency is improved. Through the method of the present application, there is no need to care about which application should provide a service to the scanned 2D code. The user may scan the 2D code directly, resulting in an effect equivalent to that after scanning by using a corresponding application.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
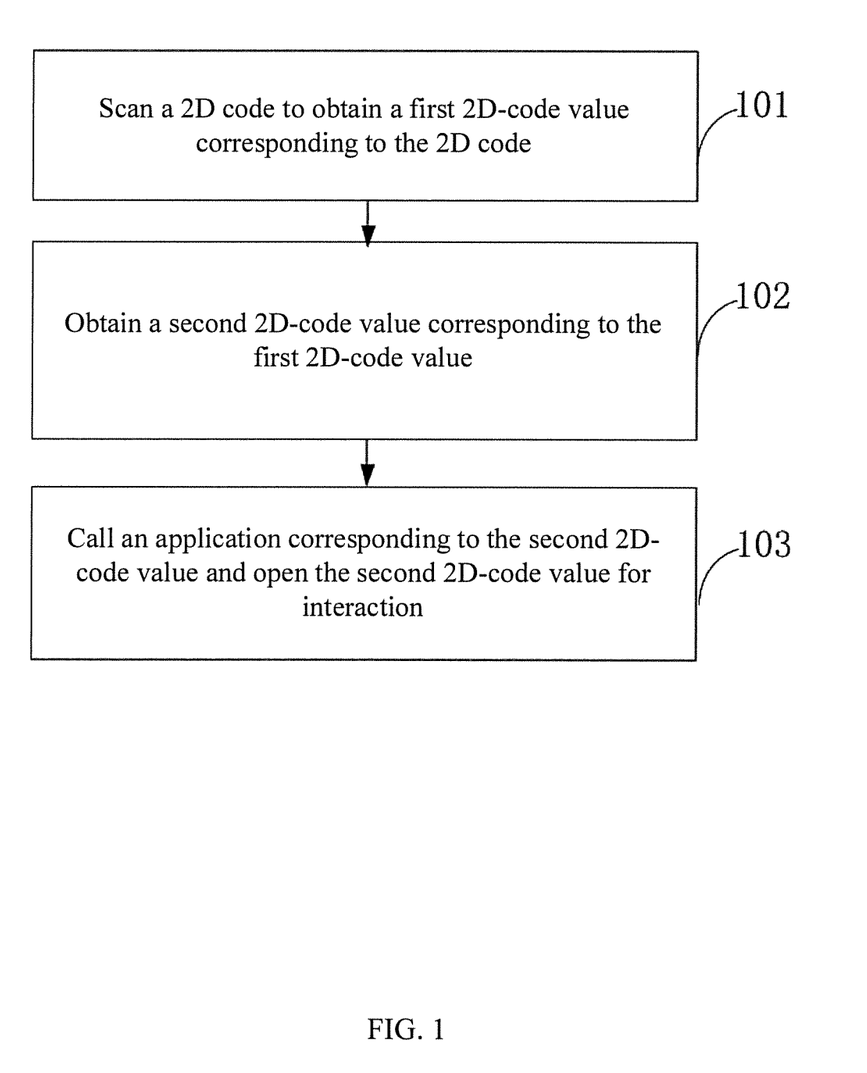
FIG. 1 is a flowchart of an exemplary 2D-code scanning interaction method, according to some embodiments of the present application.

FIG. 1 is a flowchart of an exemplary 2D-code scanning interaction method, according to some embodiments of the present application. The method may include the following steps.

Step 101: Scan a 2D code to obtain a first 2D-code value corresponding to the 2D code.

Before this step, a 2D-code scanning apparatus or a registration server may process a plurality of original 2D-code values to generate corresponding processed 2D-code values. The processed 2D-code values may be denoted as first 2D-code values. The original 2D-code values before processing may be denoted as second 2D-code values. The 2D-code scanning apparatus or the registration server may further generate a 2D code in accordance with the first 2D-code value. The 2D code, the second 2D-code value, and the first 2D-code value may correspond to one another. For a specific process of generating the 2D code, it may be referred to the descriptions of the subsequent embodiments.

In this step, the 2D code scanned by the 2D-code scanning apparatus may be one of the plurality of 2D codes generated in advance. The 2D-code scanning apparatus may scan the 2D code to obtain a first 2D-code value corresponding to the 2D code. The first 2D-code value may be a Uniform Resource Locator (URL).

In some embodiments, specific expression forms of the first 2D-code value and the second 2D-code value may be different or the same. For example, the first 2D-code value and the second 2D-code value may be both http://weixin.com/xxx.

In some embodiments, while processing the second 2D-code value as described above, identification information may also be generated. Correspondence exists between the second 2D-code value, the identification information, and the first 2D-code value. In this step, the first 2D-code value obtained by the 2D-code scanning apparatus may also include the identification information. In some embodiments, the identification information may include an identity (ID) code. For example, the first 2D-code value may be a URL as follows: http://yitaohuoyan/server?id=*. The identification information included in the first 2D-code value may be denoted as id=*.

Step 102: Obtain a second 2D-code value corresponding to the first 2D-code value.

In some embodiments, the first 2D-code value may be generated in accordance with the second 2D-code value, and may be corresponding to the second 2D-code value. The 2D-code scanning apparatus may query, directly in accordance with the first 2D-code value, a local storage or the registration server for a second 2D-code value corresponding to the first 2D-code value.

If the first 2D-code value includes the identification information, the 2D-code scanning apparatus may also search for locally or request from the registration server a second 2D-code value corresponding to the identification information. In some embodiments, the registration server may be an application server corresponding to the application.

Step 103: Call an application corresponding to the second 2D-code value and open the second 2D-code value for interaction.

After obtaining the original 2D-code value, i.e., the second 2D-code value, the 2D-code scanning apparatus may call an application corresponding to the second 2D-code value and directly open the second 2D-code value for interaction. For example, a WeChat application may be called to directly open a WeChat 2D-code value, entering an interaction interface of interest.

The calling step for an application corresponding to the second 2D-code value by the 2D-code scanning apparatus may include presetting a URL scheme in the 2D-code scanning apparatus to implement binding to the application, such as binding to the WeChat application. The URL scheme may be used to enable the bound application from a browser or another application. For example, a self-defined URL scheme: yitaohuoyan://xxx/xxx may be bound to a Yitaohuoyan application. After entering this address in the browser, the Yitaohuoyan application may be opened or called and parameters may be transmitted thereto to run the application and perform an operation. The process may be similar to some existing technologies, and is not described in detail herein.

The method of the present application, by processing a 2D-code value in advance, may allow a 2D-code scanning apparatus, when scanning a processed 2D code, to obtain a corresponding original 2D-code value before processing in accordance with the processed valued of 2D code. It may allow an application corresponding to the original 2D-code value to be called to open the original 2D-code value and present an interaction interface. Accordingly, it may avoid the need to download another application or to scan the 2D code once again in the existing technologies for entering into the interaction interface when scanning by using a non-corresponding application. Therefore, the scanning process is simplified, the number of interactions is reduced, and data processing efficiency is improved. Through the method of the present application, there is no need to care about which application should provide a service to the scanned 2D code. The user may scan the 2D code directly, resulting in an effect equivalent to that after scanning by using a corresponding application.

Figure 2:
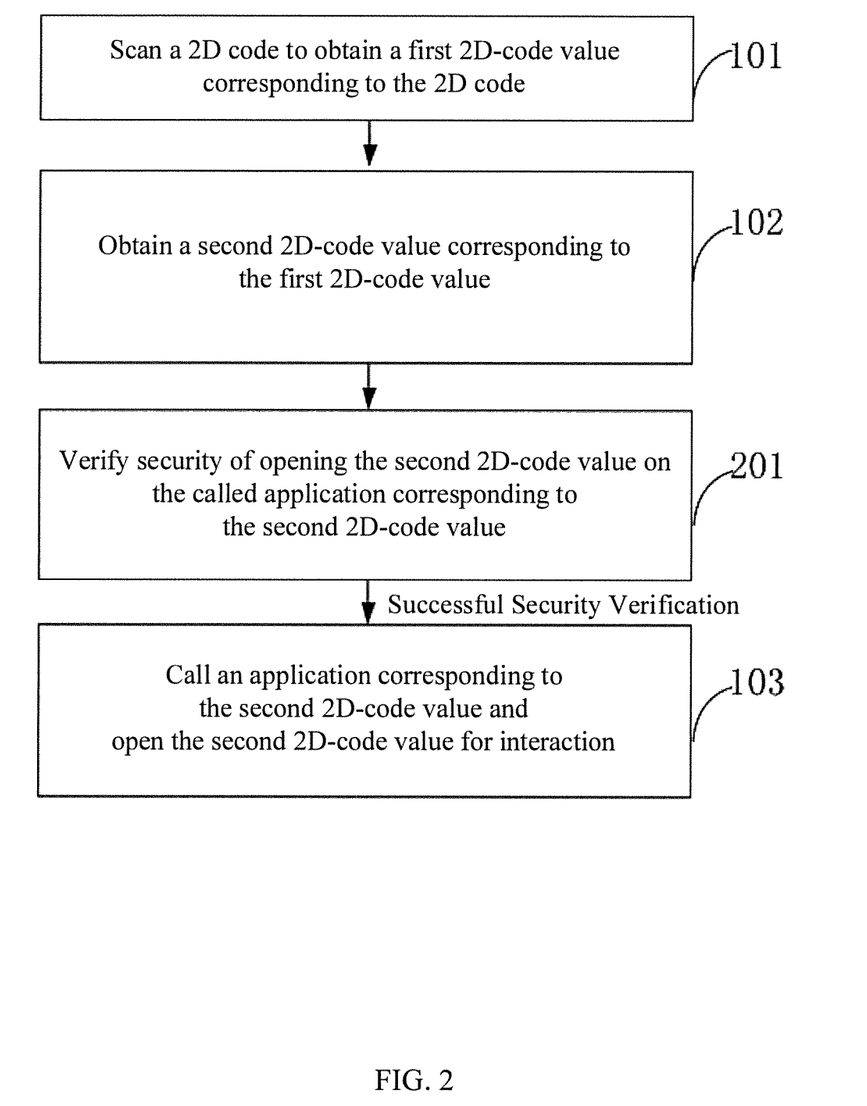
FIG. 2 is a flowchart of another exemplary 2D-code scanning interaction method, according to some embodiments of the present application.

The scanning apparatus, by the above method, may scan any 2D codes to implement interaction. It may be convenient, but may also bring potential risks. In some embodiments, before calling the application corresponding to the second 2D-code value and opening the second 2D-code value for interaction, the method may further include the following step, as shown in FIG. 2, to ensure security during the course of calling the application to implement the interaction.

Step 201: Verify security of opening the second 2D-code value on the called application corresponding to the second 2D-code value.

Figure 3:
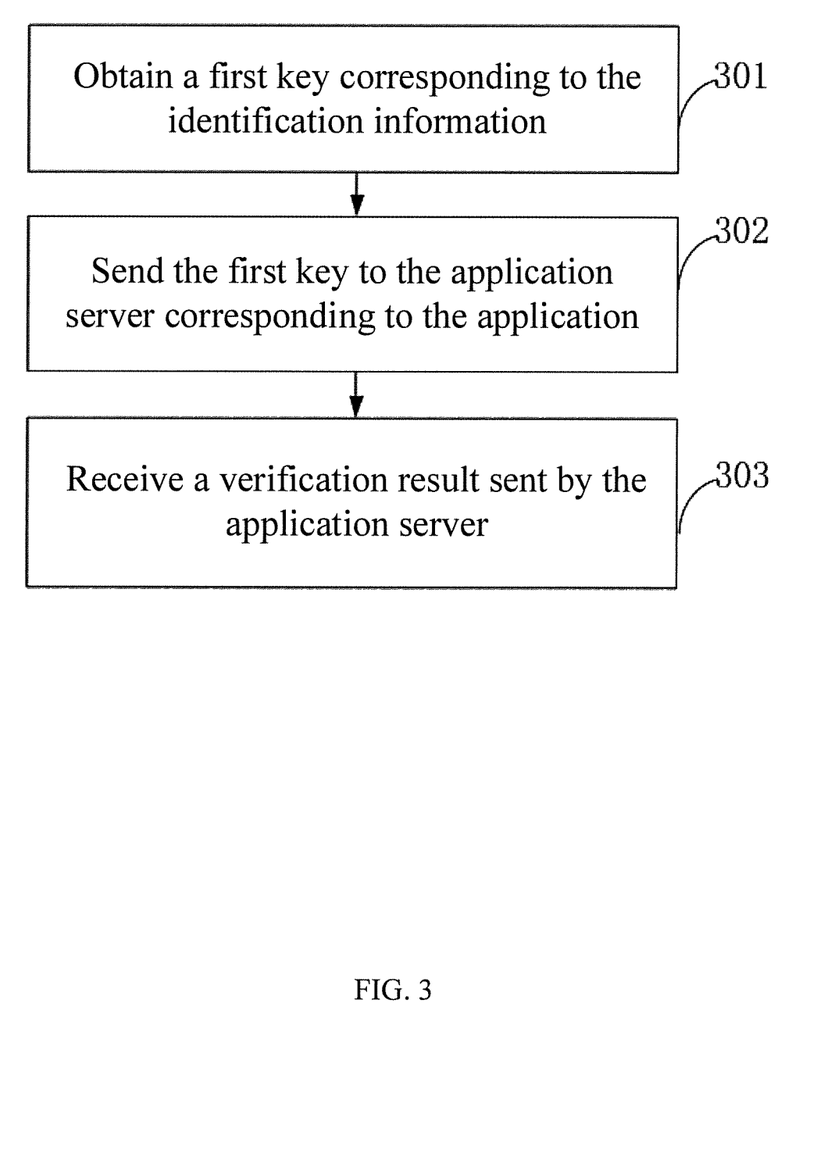
FIG. 3 is a flowchart of an exemplary method of security verification, according to some embodiments of the present application.

As shown in FIG. 3, if the first 2D-code value includes the identification information, verifying security of step 201 may include:

Step 301: Obtain a first key corresponding to the identification information.

Before the second 2D-code value is used to generate a 2D code, a key may be generated for the second 2D-code value. Accordingly, the key may also be corresponding to the first 2D-code value, the second 2D-code value, and the identification information. The key may be stored in the registration server or the 2D-code scanning apparatus, and a server of the application corresponding to the second 2D-code value, respectively. The server corresponding to the application may be denoted as an application server.

If the 2D-code scanning apparatus is legitimate or safe, it may request from the registration server or search for in a local storage of the apparatus the key corresponding to the identification information. If the 2D-code scanning apparatus is illegitimate or unsafe, the key may need to be obtained by another method. The key obtained by the 2D-code scanning apparatus may be denoted as a first key.

Step 302: Send the first key to the application server corresponding to the application. The application server may store a second key corresponding to the identification information.

The 2D-code scanning apparatus may send the first key to the application server. The application server may store a correct key in advance, which is denoted as a second key. The application server may compare the first key with the pre-stored second key. If the first key is the same as the second key, the verification result is a successful security verification succeeds. If the first and second keys are different, the verification result is a failed security verification.

Step 303: Receive a verification result sent by the application server.

The application server may send the verification result to the 2D-code scanning apparatus.

If the first 2D-code value does not include the identification information, the steps of verifying security may be similar to the above steps 301 to 303. The one difference may include that, in step 301, a corresponding first key may be obtained in accordance with the first 2D-code value, and that, in step 302, the application server may store a second key corresponding to the second 2D-code value.

There may have a variety of methods for verifying security. Using the key is only one of methods. It is merely an example, not a limitation.

In the above security verification, only when the 2D-code scanning apparatus is legitimate, the 2D-code scanning apparatus may obtain an accurate key and pass the security verification.

After verifying the security successfully, the method may include performing step 103 to call the application corresponding to the second 2D-code value and to open the second 2D-code value for interaction. If the verification fails, it may indicate that the 2D-code scanning apparatus may be illegitimate. No other operation may be performed.

By adding the above security verification, the method may effectively ensure security of interaction between applications.

Figure 4:
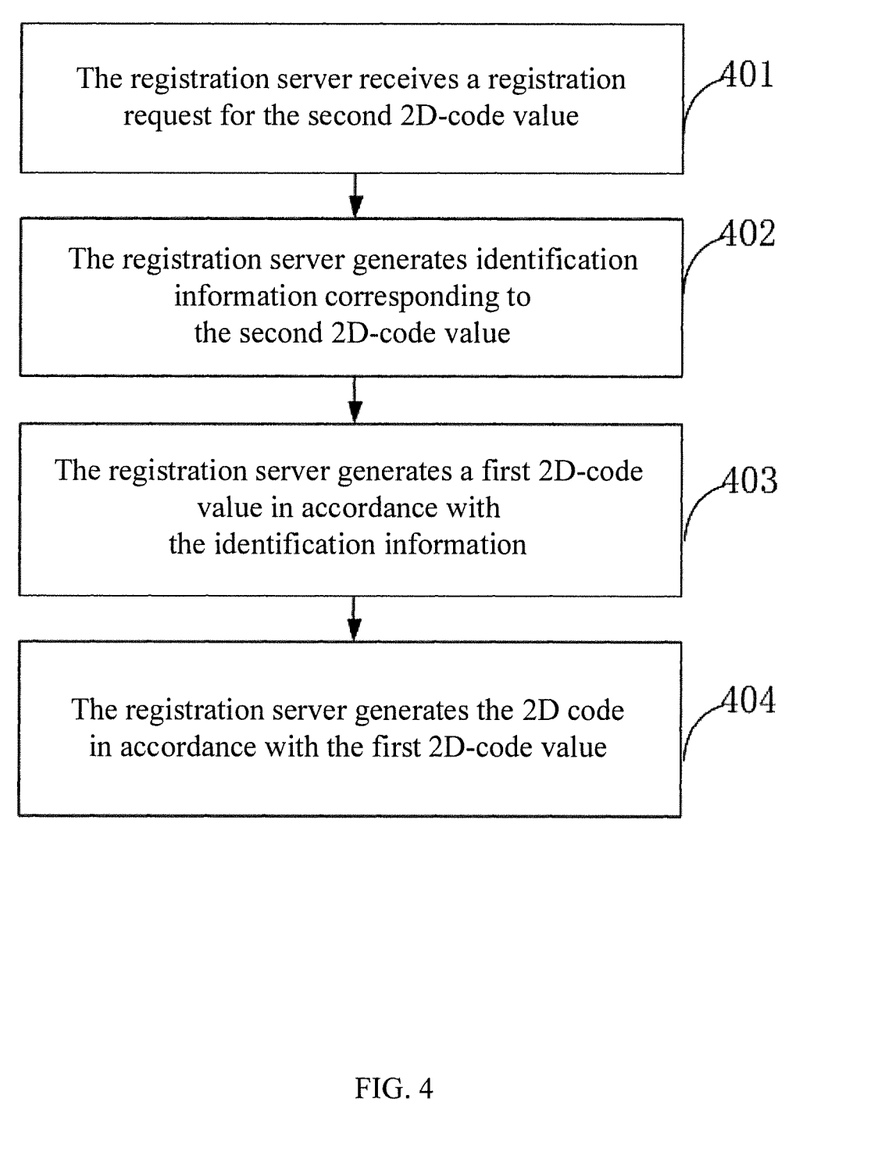
FIG. 4 is a flowchart of an exemplary method for generating a 2D code in accordance with a second 2D code value, according to some embodiments of the present application.

In some embodiments, before the 2D-code scanning apparatus scans a 2D code to obtain a first 2D-code value corresponding to the 2D code, the 2D-code scanning apparatus or the registration server may generate the 2D code in accordance with the second 2D-code value. In an example that the registration server generates a 2D code in accordance with the second 2D-code value, the method, as shown in FIG. 4, may further include:

Step 401: The registration server receives a registration request for the second 2D-code value.

Step 402: The registration server generates identification information corresponding to the second 2D-code value.

The registration server may determine whether the second 2D-code value already exists. If the second 2D-code value does not exist, the registration may generate identification information corresponding to the second 2D-code value.

Step 403: The registration server generates a first 2D-code value in accordance with the identification information.

Step 404: The registration server generates the 2D code in accordance with the first 2D-code value.

In some embodiments, before performing step 402, the registration server may also generate a key of the second 2D-code value, i.e. the second key, to facilitate the above security verification.

The steps of generating, by the 2D-code scanning apparatus, the 2D code in accordance with the second 2D-code value are similar to the above steps 401 to 404.

Figure 5:
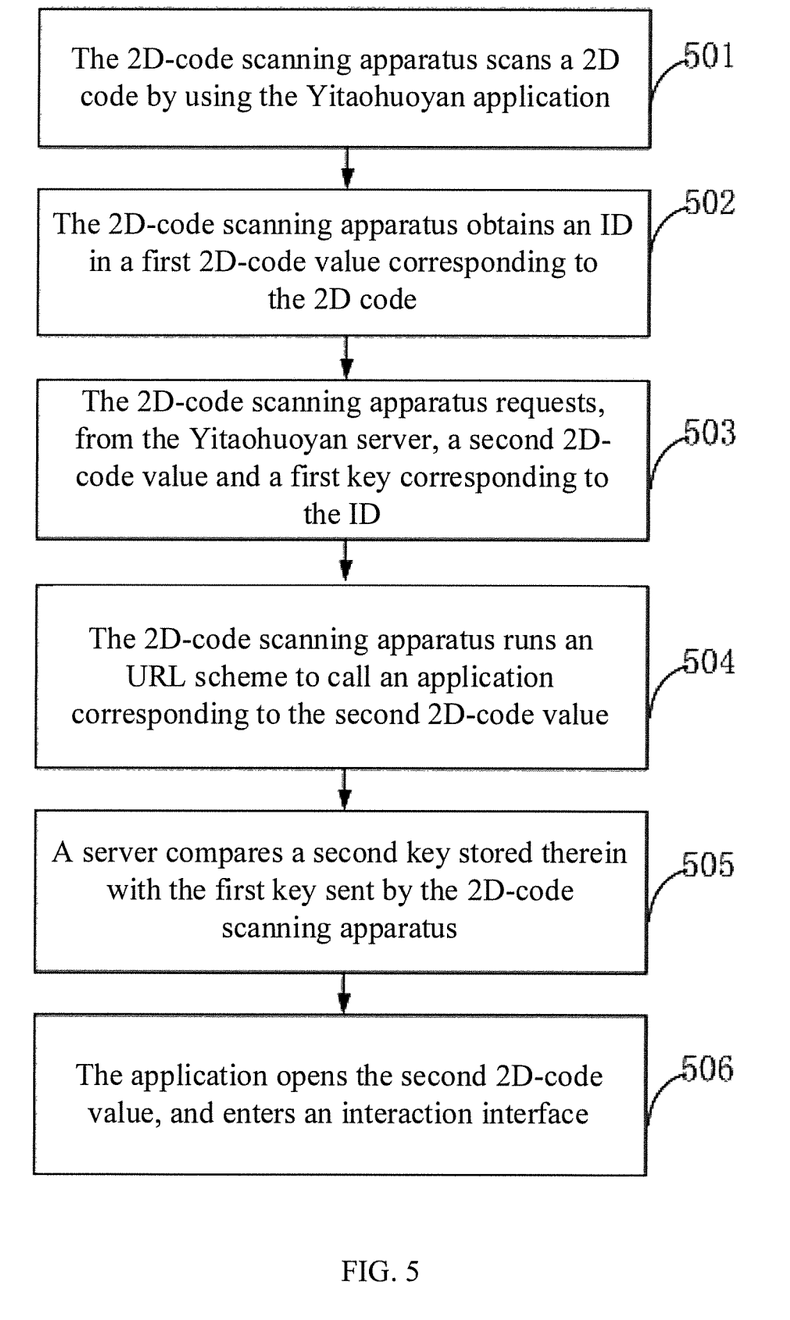
FIG. 5 is a flowchart of another exemplary 2D-code scanning interaction method, according to some embodiments of the present application.

In some embodiments, the registration server may be a Yitaohuoyan server and the 2D-code scanning apparatus may be installed with the Yitaohuoyan application. As shown in FIG. 5, the scanning interaction method may include:

Step 501: The 2D-code scanning apparatus scans a 2D code by using the Yitaohuoyan application.

The 2D code may be a 2D code processed in advance by the Yitaohuoyan server through the above steps 401 to 404.

Step 502: The 2D-code scanning apparatus obtains an ID in a first 2D-code value corresponding to the 2D code.

Step 503: The 2D-code scanning apparatus requests, from the Yitaohuoyan server, a second 2D-code value and a first key corresponding to the ID.

Step 504: The 2D-code scanning apparatus runs a URL scheme in accordance with the second 2D-code value and the first key to call an application corresponding to the second 2D-code value.

Step 505: A server corresponding to the application compares a second key stored therein with the first key sent by the 2D-code scanning apparatus.

As the first key obtained by the 2D-code scanning apparatus is a key obtained during registration of the Yitaohuoyan server for the second 2D-code value, the first key is the same as the second key. As a result, the 2D-code scanning apparatus may pass the security verification and step 506 may be performed.

Step 506: The application opens the second 2D-code value, and enters an interaction interface.

In some embodiments, the application used for the scanning by the 2D-code scanning apparatus may also be compatible with the function of the Yitaohuoyan application. For example, Gewara is integrated with the function of the Yitaohuoyan application. When the 2D-code scanning apparatus may scan, by using Gewara, a 2D code processed by the Yitaohuoyan server. Gewara may obtain identification information in a 2D-code value corresponding to the 2D code. The scanning apparatus may request an original 2D-code value and a key corresponding to the identification information from the Yitaohuoyan server in accordance with the above method. The scanning apparatus may call a corresponding application to enter an interaction interface.

It should be noted that, for ease of description, the above methods may be described as a series of action combinations. However, it is appreciated that the embodiments of the present application are not limited to the action order described herein. Some steps may be performed in other orders or simultaneously in accordance with the embodiments of the present application. Next, those people skilled in the art should also know that the embodiments described in the present application are preferred embodiments. Those steps involved therein may not necessarily be performed in some embodiments of the present application.

Figure 6:
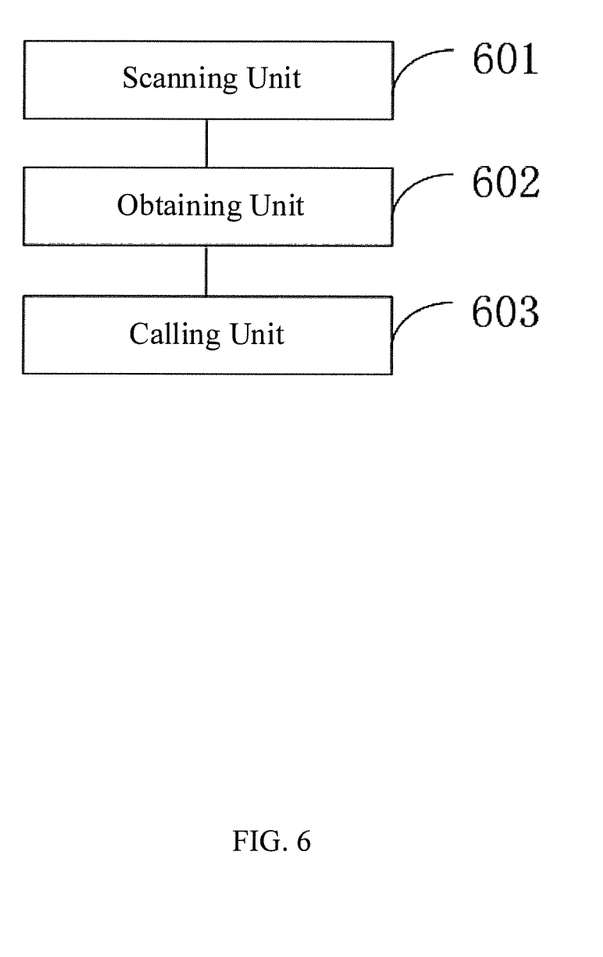
FIG. 6 is a structural block diagram of an exemplary 2D-code scanning interaction apparatus, according to some embodiments of the present application.

FIG. 6 illustrates a structural block diagram of an exemplary 2D-code scanning interaction apparatus, according to an embodiment of the present application. The apparatus may include the following units:

A scanning unit 601 configured to scan a 2D code to obtain a first 2D-code value corresponding to the 2D code.

An obtaining unit 602 configured to obtain a second 2D-code value corresponding to the first 2D-code value. The first 2D-code value may be generated in accordance with the second 2D-code value, and may be corresponding to the second 2D-code value.

A calling unit 603 configured to call an application corresponding to the second 2D-code value and open the second 2D-code value for interaction.

In general, these units (and subsequently mentioned units and sub-units) as used herein can be a packaged functional hardware unit designed for use with other components (e.g., portions of an integrated circuit) or a part of a program (stored on a computer readable medium) that performs a particular function of related functions. The unit can have entry and exit points and can be written in a programming language, such as, for example, Java, Lua, C or C++. A software unit can be compiled and linked into an executable program, installed in a dynamic link library, or written in an interpreted programming language such as, for example, BASIC, Perl, or Python. It will be appreciated that software units can be callable from other units or from themselves, and/or can be invoked in response to detected events or interrupts. Software units configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware units can be comprised of connected logic units, such as gates and flip-flops, and/or can be comprised of programmable units, such as programmable gate arrays or processors. The units or computing device functionality described herein are preferably implemented as software units, but can be represented in hardware or firmware. Generally, the units described herein refer to logical units that can be combined with other units or divided into sub-units despite their physical organization or storage.

The apparatus of the present application, by processing a 2D-code value in advance, may allow a 2D-code scanning apparatus, when scanning a processed 2D code, to obtain a corresponding original 2D-code value before processing in accordance with the processed valued of 2D code. It may allow an application corresponding to the original 2D-code value to be called to open the original 2D-code value and present an interaction interface. Accordingly, it may avoid the need to download another application or to scan the 2D code once again in the existing technologies for entering into the interaction interface when scanning by using a non-corresponding application. Therefore, the scanning process is simplified, the number of interactions is reduced, and data processing efficiency is improved.

Figure 7:
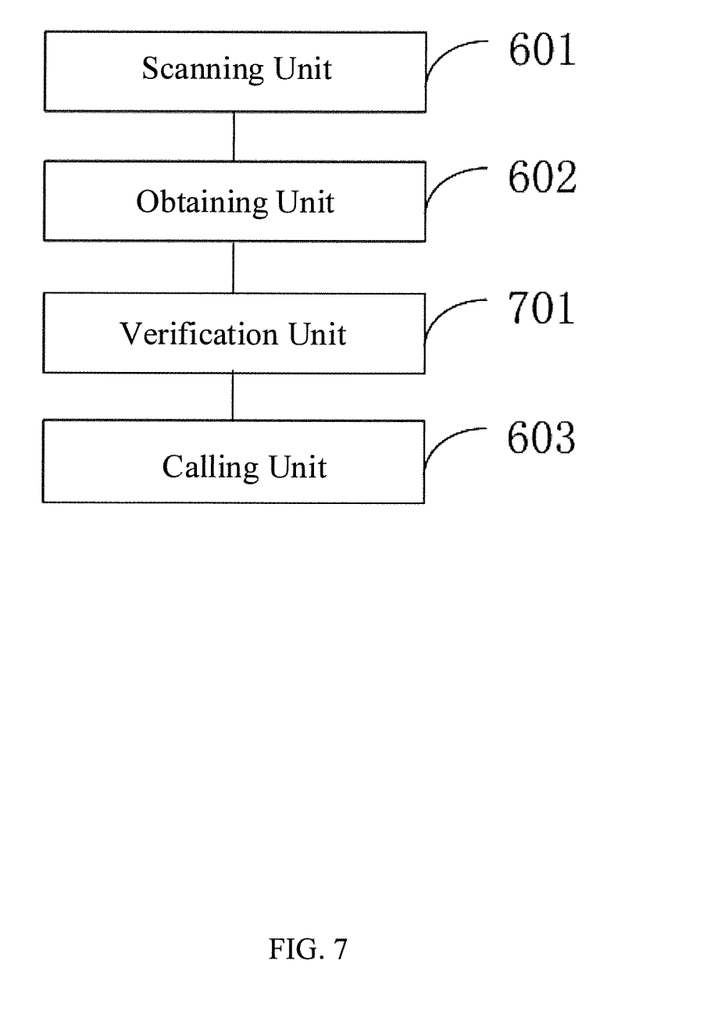
FIG. 7 is a structural block diagram of another exemplary 2D-code scanning interaction apparatus, according to some embodiments of the present application.

In some embodiments, as shown in FIG. 7, in addition to scanning unit 601, obtaining unit 602, and calling unit 603, the apparatus may further include a verification unit 701.

The first 2D-code value obtained by scanning unit 601 through scanning may include identification information.

Obtaining unit 602 may be configured to obtain a second 2D-code value corresponding to the identification information.

Verification unit 701 may be configured to verify security of opening the second 2D-code value on the called application corresponding to the second 2D-code value before calling unit 603 calls the application corresponding to the second 2D-code value and opens the second 2D-code value for interaction.

Calling unit 603 may be configured to call the application corresponding to the second 2D-code value and open the second 2D-code value for interaction after verifying the security successfully.

Figure 8:
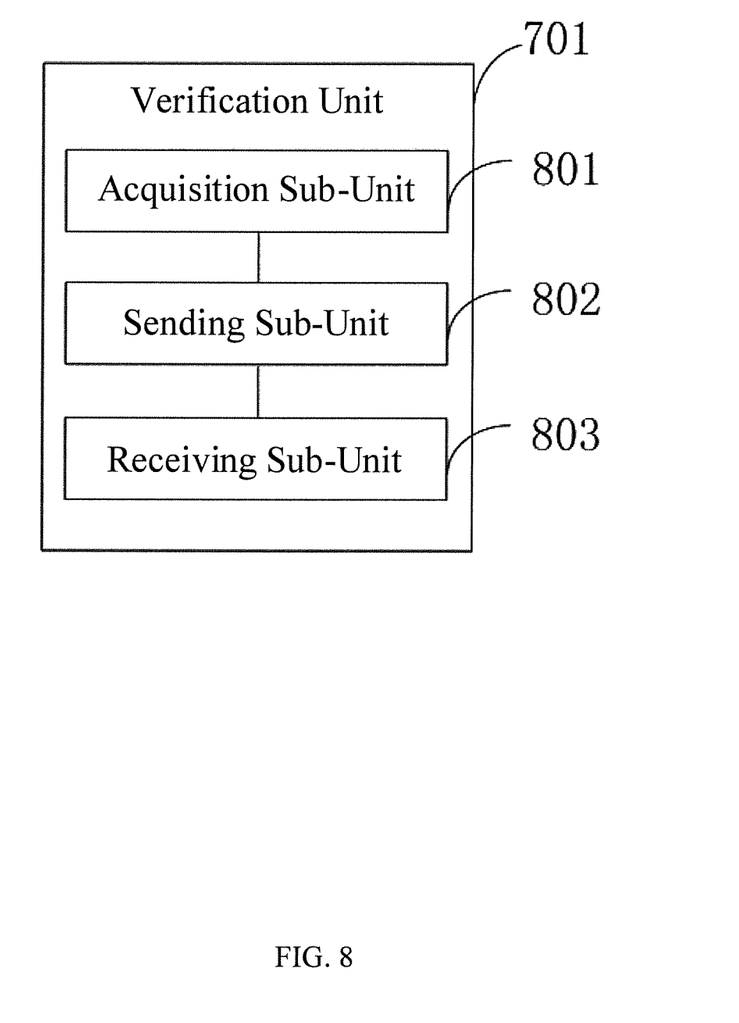
FIG. 8 is a structural block diagram of an exemplary verification unit, according to some embodiments of the present application.

As shown in FIG. 8, verification unit 701 may further include:

An acquisition sub-unit 801 configured to acquire a first key corresponding to the identification information.

A sending sub-unit 802 configured to send the first key to an application server corresponding to the application. The application server may store a second key corresponding to the identification information.

A receiving sub-unit 803 configured to receive a verification result sent by the application server. If the application server compares the first key with the second key and finds that the first and second keys are the same, the verification result is a successful security verification. If the first and second keys are different, the verification result is a failed security verification.

Figure 9:
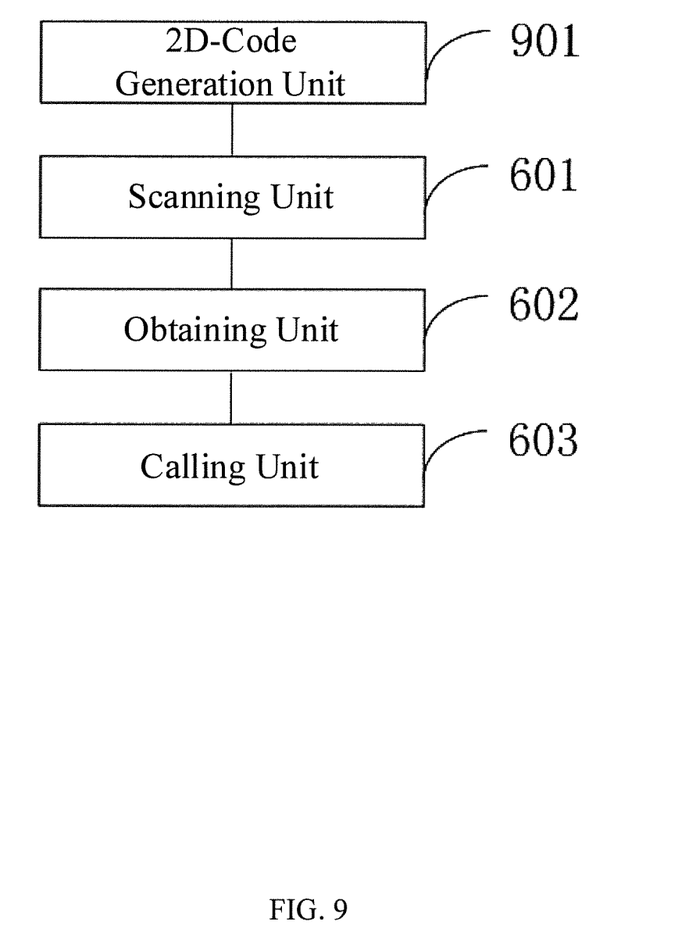
FIG. 9 is a structural block diagram of another exemplary 2D-code scanning interaction apparatus, according to some embodiments of the present application.

In some embodiments, as shown in FIG. 9, in addition to scanning unit 601, obtaining unit 602, and calling unit 603, the apparatus may further include:

A 2D-code generation unit 901 configured to generate the 2D code in accordance with the second 2D-code value before scanning unit 601 scans the 2D code to obtain the first 2D-code value corresponding to the 2D code.

2D-code generation unit 901 may further include the following sub-units.

A request receiving sub-unit configured to receive a registration request for the second 2D-code value.

A first generation sub-unit configured to generate the identification information corresponding to the second 2D-code value.

A second generation sub-unit configured to generate the first 2D-code value in accordance with the identification information.

A third generation sub-unit configured to generate the 2D code in accordance with the first 2D-code value.

The present application further discloses an electronic device, including a data bus, a memory, a display, and a processor. The processor may store a piece of executable program codes. The processor may acquire the program codes in the memory through the data bus, and performs the following steps.

- Scanning a 2D code to obtain a first 2D-code value corresponding to the 2D code by a 2D-code scanning apparatus;
- Obtaining a second 2D-code value corresponding to the first 2D-code value by the 2D-code scanning apparatus, wherein the first 2D-code value is generated in accordance with the second 2D-code value, and is corresponding to the second 2D-code value; and
- Calling an application corresponding to the second 2D-code value and opening the second 2D-code value for interaction.

The apparatus embodiments are described in a simple manner since they are similar to the method embodiments. For those related parts, please refer to the descriptions of the counterparts in the method embodiments.

The embodiments of the present application are all described in a progressive manner. The description of each embodiment may emphasize a difference between the embodiment and other embodiments. Those identical or similar parts in the embodiments may be available by reference to each other.

Those people skilled in the art should understand that, the embodiments in accordance with the embodiments of the present application may be provided as a method, an apparatus, or a computer program product. Therefore, the embodiments of the present application may be implemented as a complete hardware embodiment, a complete software embodiment, or an embodiment combining software and hardware. Moreover, the embodiments of the present application may be in the form of a computer program product implemented on one or more computer-accessible storage media, such as a magnetic disk memory, a Compact Disc Read-Only Memory (CD-ROM), and an optical memory, including computer usable program codes.

In a typical configuration, the computer device may include one or more processors (CPUs), an input/output interface, a network interface, and a memory. The memory may include a volatile memory, a random access memory (RAM) and/or a non-volatile memory or the like in a computer readable medium, for example, a read-only memory (ROM) or a flash RAM. Such memory may be an example of the computer readable medium. The computer readable medium may include non-volatile and volatile media as well as movable and non-movable media, and may implement information storage by means of any method or technology. Information may be a computer readable instruction, a data structure, and a module of a program or other data. An example of storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a cache, a register, a magnetic tape/magnetic disk storage or other magnetic storage devices, or any other non-transmission medium, and can be used to store information accessible to the computing device. According to the definition herein, the computer readable medium does not include transitory media, such as modulated data signals and carriers.

The embodiments of the present application are described with reference to flow charts and/or block diagrams in accordance with the method, terminal device (system) and computer program product of the embodiments of the present application. It should be understood that a computer program instruction may be used to implement each process and/or block in the flow charts and/or block diagrams and combinations of processes and/or blocks in the flow charts and/or block diagrams. The computer program instructions may be provided to a universal computer, a dedicated computer, an embedded processor or a processor of another programmable data processing terminal device to generate a machine, such that the computer or the processor of another programmable data processing terminal device executes an instruction to generate an apparatus configured to implement functions designated in one or more processes in a flow chart and/or one or more blocks in a block diagram.

The computer program instructions may also be stored in a computer readable storage that may guide the computer or another programmable data processing terminal device to work in a specific manner. The instruction stored in the computer readable storage may generate an article of manufacture including an instruction apparatus, and the instruction apparatus may implement functions designated in one or more processes in a flow chart and/or one or more blocks in a block diagram.

The computer program instructions may also be installed in the computer or another programmable data processing terminal device, such that a series of operational steps may be executed on the computer or another programmable terminal device to generate a computer implemented processing. Therefore, the instructions executed by the computer or another programmable terminal device may provide steps for implementing functions designated in one or more processes in a flow chart and/or one or more blocks in a block diagram.

Preferred embodiments of the embodiments of the present invention have been described. However, once knowing basic creative concepts, those people skilled in the art may make other variations and modifications to the embodiments. Therefore, the appended claims are intended to be explained as including the preferred embodiments and all variations and modifications falling within the scope of the embodiments of the present application.

Finally, it should be further noted that, the relation terms such as first and second may merely be used to distinguish one entity or operation from another entity or operation, and may not require or imply that the entities or operations have this actual relation or order. Moreover, the terms "include," "comprise" or any other variation thereof are intended to cover non-exclusive inclusion, so that a process, method, article or terminal device including a series of elements may not only include the elements, but also include other elements not clearly listed, or may further include inherent elements of the process, method, article or terminal device. In the absence of more limitations, an element defined by "including a/an . . . " may not exclude that the process, method, article or terminal device including the element further has other identical elements.

2D-code scanning interaction methods and apparatuses presented in the present application are described in detail above. The principles and implementation manners of the present application are described by applying specific examples herein. The above descriptions of the embodiments may merely be used to help understand the method of the present application and core ideas thereof. Meanwhile, for those people of ordinary skill in the art, there may be modifications to the specific implementation manners and application scopes in accordance with the idea of the present application. Therefore, the content of the specification should not be construed as limitation to the present application.

What is claimed is:

1. A method of interacting with two-dimensional (2D) codes, the method comprising:
   acquiring, by an apparatus, a first 2D-code value corresponding to a scanned 2D code;
   determining, by the apparatus, an application associated with the first 2D-code value by querying a local storage of the apparatus; and
   responsive to determining the application associated with the first 2D-code value:
     obtaining a second 2D-code value corresponding to the first 2D-code value; and
     calling the application to open the second 2D-code value.

2. The method according to claim 1, wherein:
   the first 2D-code value includes identification information; and
   obtaining the second 2D-code value corresponding to the first 2D-code value includes obtaining the second 2D-code value corresponding to the identification information.

3. The method according to claim 2, further comprising:
verifying, before calling the application to open the second 2D-code value, security of opening the second 2D-code value with the application; and
calling the application to open the second 2D-code value includes, after verifying the security successfully, calling the application to open the second 2D-code value.

4. The method according to claim 3, wherein verifying security of opening the second 2D-code value with the called application corresponding to the second 2D-code value includes:
obtaining a first key corresponding to the identification information;
sending the first key to an application server corresponding to the application, wherein the first key is used by the application server to compare against a stored second key corresponding to the identification information; and
receiving a verification result from the application server, wherein the verification result is a successful security verification based on the first key matching the second key or is failed security verification based on the first and second keys being different.

5. The method according to claim 2, further comprising generating, before acquiring the first 2D-code value corresponding to the scanned 2D code, the 2D code in accordance with the second 2D-code value.

6. A system for interacting with 2D codes, comprising:
a memory device that stores a set of instructions; and
at least one processor capable of executing the set of instructions to cause the system to perform:
acquiring a first 2D-code value corresponding to a scanned 2D code;
determining an application associated with the first 2D-code value by querying a local storage of the system; and
responsive to determining the application associated with the first 2D-code value:
obtaining a second 2D-code value corresponding to the first 2D-code value; and
calling the application to open the second 2D-code value.

7. The system according to claim 6, wherein:
the first 2D-code value includes identification information; and
obtaining the second 2D-code value corresponding to the first 2D-code value includes obtaining the second 2D-code value corresponding to the identification information.

8. The system according to claim 7, wherein the at least one processor is configured to execute the set of instructions to cause the system to further perform:
verifying, before calling the application to open the second 2D-code value, security of opening the second 2D-code value with the application; and
calling the application to open the second 2D-code value includes, after verifying the security, calling the application to open the second 2D-code value.

9. The system according to claim 8, wherein verifying security of opening the second 2D-code value with the called application corresponding to the second 2D-code value includes:
obtaining a first key corresponding to the identification information;
sending the first key to an application server corresponding to the application, wherein the first key is used by the application server to compare against a stored second key corresponding to the identification information; and
receiving a verification result from the application server, wherein the verification result is a successful security verification based on the first key matching the second key or is a failed security verification based on the first and second keys being different.

10. The system according to claim 7, wherein the at least one processor is configured to execute the set of instructions to cause the system to further perform generating, before acquiring the first 2D-code value corresponding to the scanned 2D code, the 2D code in accordance with the second 2D-code value.

11. A non-transitory computer readable medium that stores a set of instructions that is executable by at least one processor of an apparatus to cause the apparatus to perform a method of interacting with 2D-codes, the method comprising:
acquiring, by the apparatus, a first 2D-code value corresponding to a scanned 2D code;
determining, by the apparatus, an application associated with the first 2D-code value by querying a local storage of the apparatus; and
responsive to determining the application associated with the first 2D-code value:
obtaining a second 2D-code value corresponding to the first 2D-code value; and
calling the application to open the second 2D-code value.

12. The non-transitory computer-readable medium of claim 11, wherein:
the first 2D-code value includes identification information; and
obtaining the second 2D-code value corresponding to the first 2D-code value includes obtaining the second 2D-code value corresponding to the identification information.

13. The non-transitory computer-readable medium of claim 12, wherein the set of instructions that are executable by at least one processor of the computer system cause the computer system to further perform:
verifying, before calling the application to open the second 2D-code value, security of opening the second 2D-code value with the application; and
calling the application to open the second 2D-code value includes, after verifying the security successfully, calling the application to open the second 2D-code value.

14. The non-transitory computer-readable medium of claim 13, wherein verifying security of opening the second 2D-code value with the called application corresponding to the second 2D-code value includes:
obtaining a first key corresponding to the identification information;
sending the first key to an application server corresponding to the application, wherein the first key is used by the application server to compare against a stored second key corresponding to the identification information; and
receiving a verification result from the application server, wherein the verification result is a successful security verification based on the first key matching the second key or is a failed security verification based on the first key and second keys being different.

15. The non-transitory computer-readable medium of claim 12, wherein the set of instructions that is executable by the at least one processor of the computer system cause the computer system to further perform generating, before acquiring the first 2D-code value corresponding to the scanned 2D code, the 2D code in accordance with the second 2D-code value.

* * * * *